April 13, 1965   P. P. ANDERSON, JR   3,177,930
REFRIGERATION SYSTEM
Filed Sept. 26, 1960   2 Sheets-Sheet 1
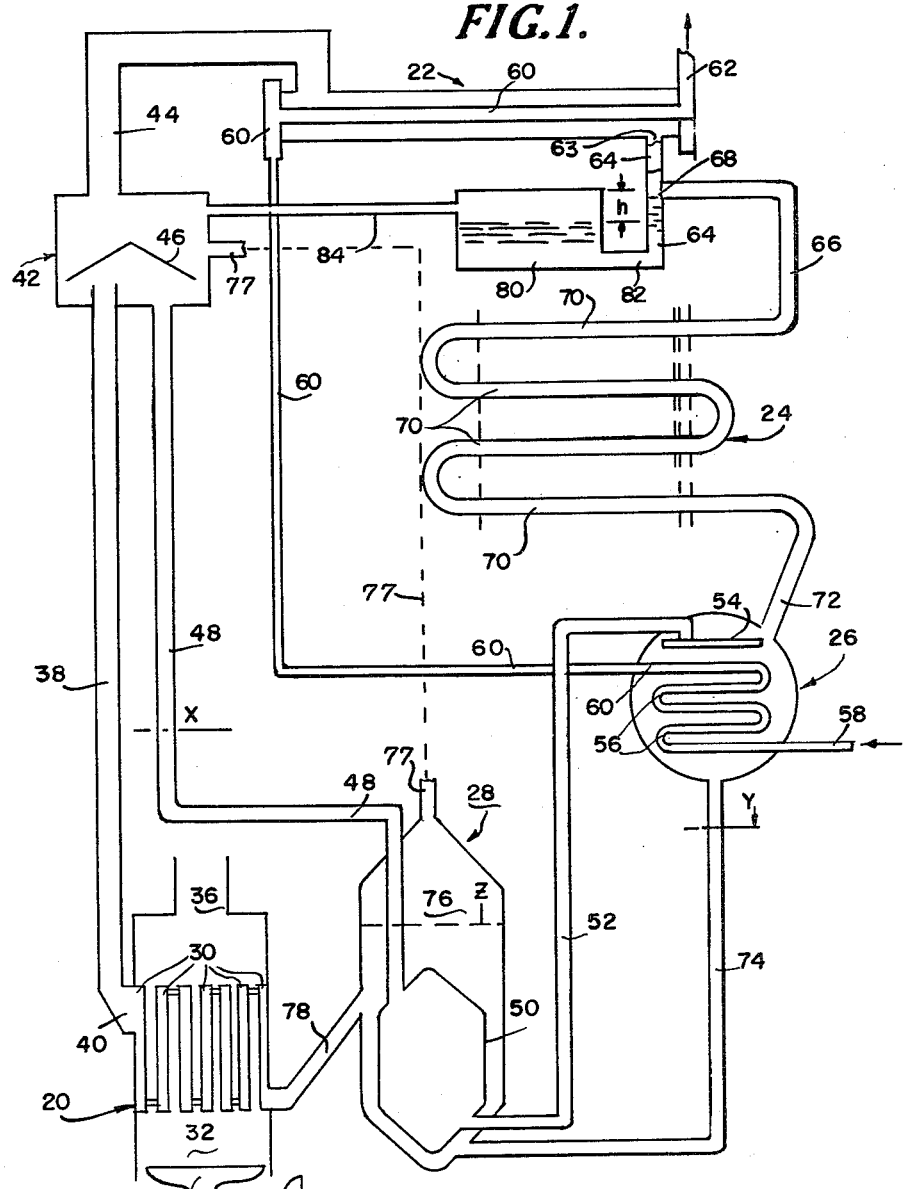
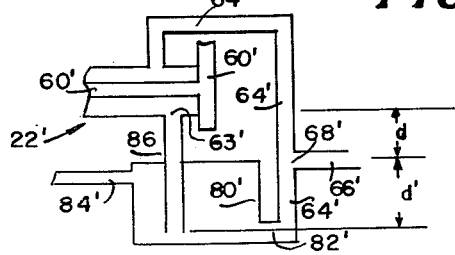
INVENTOR
PHILIP P. ANDERSON, JR.
BY Cushman, Darby & Cushman
ATTORNEYS 3,177,930
REFRIGERATION SYSTEM
Philip P. Anderson, Jr., Newburgh, Ind., assignor to Arkla Industries Inc., Evansville, Ind., a corporation of Delaware
Filed Sept. 26, 1960, Ser. No. 58,464
17 Claims. (Cl. 165—62)

This invention relates to absorption refrigeration systems and more particularly to arrangements for controlling the concentration of the absorption solution in such systems.

While the present invention may be applied to other absorption refrigeration systems, it is particularly adapted for use in systems of the general type disclosed in the patent to Thomas et al., 2,282,503. The refrigeration system disclosed in this patent operates in a partial vacuum having a high pressure side including a generator and condenser, and a low pressure side including an evaporator and an absorber. In the illustrative embodiment described in the Thomas et al. patent, water is the refrigerant, and the absorbent is a saline solution, such as a water solution of a salt, for example, lithium chloride, lithium bromide, or the like. The refrigerant and absorbent are introduced into the system as a water solution of a salt, as referred to, and the absorbent occurs in the system as a dilute or concentrated water solution of the salt.

These refrigeration units may be used for refrigerating any medium and have been used quite extensively in air conditioning systems to cool the air delivered to an enclosure. If the unit is initially charged with saline solution at maximum concentration for particular operating conditions, a change in operating conditions may cause freezing of the refrigerant in the evaporator, the blowing out of liquid refrigerant from the evaporator tubes due to rapid evaporation, or crystallization and precipitation of salt from the solution. Such changes in operating conditions may be caused, for example, by changes in the cooling water temperature for the condenser.

If the unit is initially charged with an excessively dilute solution of the saline absorbent, the refrigerant will not freeze in the evaporator nor be blown from the tubes thereof and crystallization and precipitation of salt from the solution will be avoided. However, with such a dilute absorption solution, the unit will not produce an evaporator temperature suitable for air conditioning at higher cooling water temperatures.

It has been the practice to initially charge the units with a saline solution of such concentration as to produce the best results for average cooling water temperatures to adapt the unit for use in any locality, but the unit will not have optimum operating characteristics with cooling water at high or low temperatures.

It has heretofore been proposed to provide means in refrigeration systems, of the type referred to, for varying the concentration of the absorption solution in accordance with variations in operating conditions in an effort to keep the refrigeration capacity and operating characteristics of the unit more uniform under all operating conditions.

The means for controlling the concentration of the absorption solution and previously proposed for absorption air conditioning units, of the type referred to, include a storage vessel for liquid refrigerant arranged to withdraw liquid refrigeration from circulation in the system if there is an overabundance of liquid refrigerant in the evaporator, that is, the operation of the concentration control depends on overflow from the evaporator for the supply of refrigerant to the storage vessel, and the amount of liquid refrigerant withdrawn from the system and stored in this vessel depends on the pressure difference between the high and low pressure sides of the system. Since there is only a small variation in the low pressure side, the amount of liquid refrigerant stored out of the system may be said to depend primarily on condenser pressure.

Each time the unit is turned off, these concentration controls dump their storage back into the system, and hence, must be filled again when the unit is restarted. In other words, each time the unit ceases operation, the liquid refrigerant that had been withdrawn from the system and retained in the concentration control storage vessel will be returned back to the active circuit of the system. Thus, on starting the machine after shutdown, the evaporator temperature will be above normal and will give higher humidity in the space to be conditioned, until the concentration control arrangement has operated to withdrawn sufficient refrigerant from the system to permit the unit to function effectively. During long cycles of operation, this condition may not be of any great significance, however, during shorter cycles it presents a serious problem. In addition to resulting in higher humidity in the conditioned space upon start-up, the refrigerant which is dumped from the concentration control back to the active circuit also represents operation of the unit for which no cooling is obtained.

In order to overcome the foregoing and other disadvantages of prior concentration control arrangements, it is an important object of the present invention to provide a novel concentration control arrangement in absorption refrigeration systems, of the type referred to, designed to withdraw some liquid refrigerant from the normal refrigerant flow circuit during periods of operation and to retain such withdrawn liquid out of the normal refrigerant flow circuit during periods when the apparatus is not operating. A more specific and related object is to construct such a concentration control arrangement so that the amount of liquid refrigerant withdrawn from the system will vary directly in accordance with the condenser temperature.

In one of the illustrative embodiments of the invention, as will be referred to in more detail hereinbelow, the concentration control arrangement comprises a control chamber or storage vessel positioned to receive liquid refrigerant directly from the condenser and connected so that the amount of refrigerant stored in the chamber is governed by the pressure drop existing between (1) that part of the main flow path intermediate the generator and condenser, for example, the separate head, and (2) the discharge end of the condenser. This pressure difference will vary inversely with the condenser temperature, and it is applied to the storage chamber in such manner as to cause storage to vary with condenser temperature.

A further object of the invention is to design a concentration control arrangement, as just referred to, to include means preventing absorption solution from entering the storage chamber.

It is also contemplated by the present invention that the novel concentration control arrangement be adapted for use with absorption refrigeration systems which are designed to be used either as a heating or cooling unit. One such system is disclosed in the patent to Sherwood, 2,557,573, and, as disclosed in that patent, the system is basically the same as that described in the Thomas et al. patent, except that it is modified to permit flow of hot water vapor from the generator directly to the evaporator, when it is desired to use the unit for heating purposes.

Accordingly, a still further object is to provide absorption refrigeration units of this type with novel means, of the type referred to above, for controlling the concentration of the absorption solution.

Inasmuch as such novel means is designed to retain withdrawn liquid refrigerant out of the active circuit of the system after the machine is shut down, it is contemplated that means be provided in combination with the concentration control arrangement for permitting the liquid refrigerant stored out of the active circuit during a cooling cycle to be desirably returned to the active circuit during heating cycles, that is, when the unit is being used for heating purposes. In the illustrative embodiment of this feature of the invention, means are arranged in the by-pass conduit (which contains the liquid barrier during cooling cycles) in communication with the storage vessel of the concentration control and adapted to induce a flow of liquid refrigerant from the storage vessel into the by-pass conduit when the unit is being operated for heating purposes.

Further objects and advantages of the invention will be in part obvious and in part pointed out hereinafter.

The novel features of the invention may be best made clear from the following description and accompanying drawings in which:

FIGURE 1 is a diagrammatic view of an absorption refrigeration unit embodying the invention;

FIGURE 2 is a fragmentary diagrammatic view showing a modification of novel features illustrated in FIGURE 1.

Figure 3:
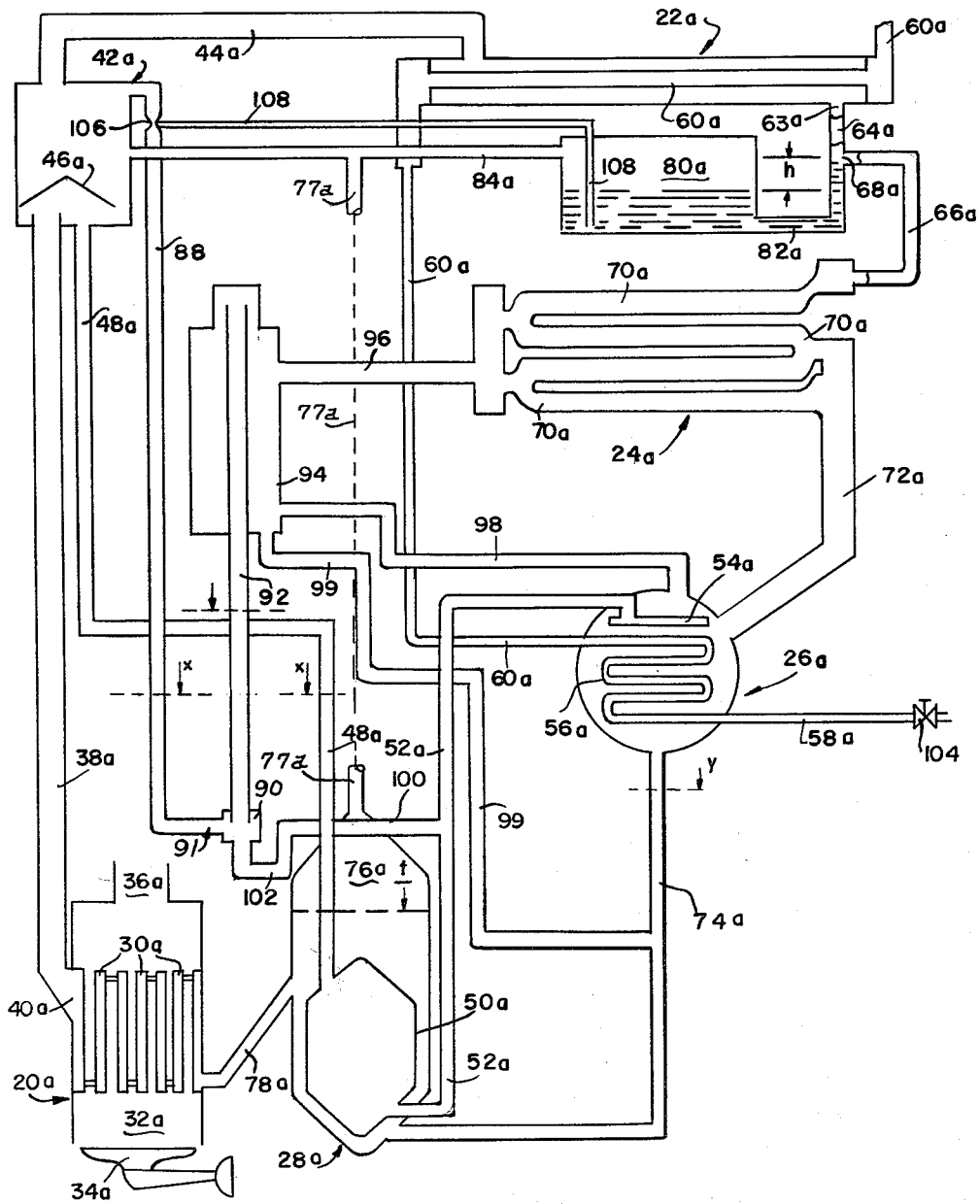
FIGURE 3 is a diagrammatic view of an absorption refrigeration system of the type designed to be used for heating or cooling purposes and also embodying the invention.

Referring now to the drawings, an illustrative embodiment of the invention is shown in FIGURE 1 as being applied to an absorption refrigeration system of the general type disclosed in the Thomas et al. patent, referred to above. Accordingly, the disclosure of that patent is incorporated herein by reference, insofar as it contributes to the description and understanding of the type of system to which the present invention is particularly applicable, as previously indicated.

The refrigeration system has been shown schematically in one form in FIGURE 1 purely for illustrative purposes, it being understood that the various structures shown in that figure and not a part of the invention may be altered, as desired. It comprises a generator 20, a condenser 22, an evaporator 24, an absorber 26, and a heat exchanger 28 interconnected to provide paths of flow for the circulation of refrigerant and absorption solution through the system, as will be understood. These various parts may be of any conventional construction, sealed from the surrounding atmosphere to maintain the subatmospheric pressure conditions therein, as will be appreciated.

The generator 20 is shown, for illustrative purposes, as including a plurality of tubular members 30 suitably interconnected as indicated for the flow therethrough of the mixture of refrigerant and absorbent, that is, the dilute absorption solution. These tubular members 30 are heated by any appropriate structure. As shown, they are arranged within a heating chamber 32, with a conventional gas burner 34 arranged underneath the members 30, and with a suitable flue 36 being provided at the upper end of the heating chamber.

A vapor lift tube 38 leaves from the outlet 40 of the tubular members 30 to a separating chamber or separator head 42. As is understood, water vapor boiled off in the members 30 will flow up the tube 38, and carry droplets of liquid absorption solution to the separator head 42.

A conduit 44 is shown as connecting the separator head 42 to the condenser 22, and suitable baffling 46 may be provided in the separator to assure that only refrigerant vapor will flow in the conduit 44 to the condenser.

An absorption solution conduit 48 is shown as leading from the separator head 42 to an inner vessel 50 within the heat exchanger 28, and a conduit 52 is shown as connecting this vessel 50 to a distributing member or spray header 54 within the absorber 26. As indicated, the absorber may be of any suitable construction, and cooling coils 56 are shown therein communicating with an inlet 58 connected to some appropriate source of cooling medium, for example, water. A conduit 60 connects these cooling coils 56 to the condenser, for the flow of the same cooling medium through the condenser and then through the outlet 62, as is understood. The flow of cooling medium will be hydraulically isolated from the flow of the refrigerant and absorbent in the condenser and absorber.

The refrigerant vapor entering the condenser 22 will be condensed therein by reason of the flow of cooling medium therethrough, and liquid refrigerant will leave the condenser through outlet 63 and discharge into conduit 64 for flow to the evaporator 24 through a conduit 66. Suitable means will be provided for maintaining the pressure difference between the condenser and evaporator. As shown in FIGURE 1, this means comprises an orifice 68 arranged at the inlet to conduit 66 whereby the liquid refrigerant entering the conduit 66 will undergo a pressure drop before reaching the evaporator, as discussed, for example, in the Berry Patent No. 2,563,575.

The evaporator 24 is shown as including a plurality of horizontal, finned tubes 70 interconnected for the flow of refrigerant therethrough. A conduit 72 connects the evaporator to the absorber, and the liquid refrigerant, vaporized in the evaporator 24 to effect the desired cooling of the surrounding medium, will enter the absorber 26 where it will be absorbed by the absorption solution therein. The distributor or spray header 54 in the absorber preferably is designed to effect a desired distribution of the absorption solution over the cooling coils 56 to facilitate the absorption of refrigerant vapor.

The absorption solution diluted in the absorber will then flow through a conduit 74 to the outer chamber 76 of the heat exchanger, and through a conduit 78 into the inlet for the tubular members 30 in the generator 20. It will be understood that the flow of dilute absorption solution through the outer chamber 76 of the heat exchanger 28 will be isolated from the flow of concentrated absorption solution through the inner vessel 50.

The heat exchanger 28 is shown for illustrative purposes as being of the type disclosed in the patent to Simpson, No. 2,685,781, and a vent line 77 is shown connecting the top of the heat exchanger 28 to the separator 42 whereby the heat exchanger will be in communication with the vapor space in the high pressure side of the system. Vent line 77 could connect either into the pipe 44 or the pipe 84, rather than separator 42 for the same purpose, as will be evident.

It will be seen that the refrigeration system thus far described operates in the same general manner as that disclosed in the Thomas et al. patent. As previously indicated, the orifice 68 maintains the pressure difference between the condenser 22 and evaporator 24; and liquid columns formed in the conduits 48, 52, 74 will maintain the pressure difference between the generator 20 and separator 42 on the one hand, and the absorber 26 on the other, as suggested in the Thomas et al. patent. Exemplary levels of the top of the liquid columns in conduits 48 and 74 are indicated by the letters X and Y, respectively, and Z indicates an exemplary liquid level in the outer chamber 76 of the heat exchanger.

As will be apparent from the foregoing, during operation the refrigerant evaporated in the generator 20 will operate to pump the liquid absorbent to the separator head 42 through vapor lift tube 38. In the separator head, the water vapor will be separated from the liquid absorbent, the former passing through the conduit 44 to the condenser 22, and the absorption solution weak in refrigerant passing to the absorber 26 through the conduit 48, heat exchanger 28, and conduit 52. The condensed liquid refrigerant leaving the condenser 22 will enter the evaporator through the conduit 66 where it will be at a lower pressure and evaporated by absorbing heat from the surrounding medium to effect the desired cooling. The refrigerant vapor, so formed, then enters the absorber 26 from the conduit 72 where it is absorbed by the absorption solution therein. The dilute absorption solution then passes back to the generator 20 through the heat exchanger. Thus, it will be seen that there are two active and partially overlapping circuits in the system, one for the absorption solution and one for the refrigerant.

As indicated hereinabove, variations in operating conditions may result in freezing of the refrigerant in the evaporator, the blowing out of liquid refrigerant from the evaporator tubes due to rapid evaporation, or crystallization and precipitation of salt from the absorption solution. Thus, it is important that the amount of liquid refrigerant circulating in the active circuits be automatically controlled in accordance with changes in operating conditions to avoid such consequences. Previously proposed control arrangements usually included a vessel for storing liquid refrigerant out of the active part of the system in accordance with variations in the difference in pressure between the high and low pressure sides of the unit. These arrangements were not entirely satisfactory, as explained above, for the reason that they returned the stored liquid refrigerant back to active part of the system when the operation of the machine was terminated, thus involving operation of the unit for which no cooling was obtained, and resulting in a delaying of the cooling action of the evaporator upon the beginning of another cycle of operation.

In accordance with the present invention, a concentration control arrangement is provided for withdrawing some liquid refrigerant from the active part of the system during an operating cycle, and for retaining it out of the active circuit during shutdown. In the embodiment shown in FIGURE 1, this arrangement comprises a vessel 80 defining a storage chamber located under the condenser 22 and connected to receive liquid refrigerant from the condenser. A conduit 82 is shown as connecting the bottom of the storage chamber 80 to an extension of the conduit 64 leading from the condenser; while a conduit 84 is shown as establishing open pressure communication between the chamber 80 and the separator head 42.

During operation of the unit, condensed liquid refrigerant will be delivered into the storage chamber 80 through conduits 64, 82, to be stored therein out of the active circuit. The amount of refrigerant stored in the chamber 80 will be governed by the pressure drop from the separator head 42 to the discharge end 63 of the condenser. This pressure difference, indicated by the dimension $h$ in the drawing, will vary inversely with the condenser temperature, and is applied through line 84 to cause the quantity of liquid refrigerant stored in the chamber 80 to vary with the condenser temperature. Thus, as the temperature of the cooling medium flowing through the condenser increases, the pressure at the discharge end of the condenser will increase and become closer to the pressure existing in the separator head 42 whereby the pressure differential indicated by the dimension $h$ will decrease, and more liquid refrigerant will be stored in the chamber 80. Conversely, as the temperature of the cooling medium flowing through the condenser decreases, the pressure at the discharge end of the condenser also decreases whereby the pressure difference $h$ will increase and less liquid refrigerant will be stored in the concentration chamber 80.

While the embodiment of the invention illustrated in FIGURE 1 will be satisfactory in overcoming the disadvantages of concentration control arrangements referred to hereinabove, FIGURE 2 illustrates a modification thereof which is designed to positively prevent the accumulation of any absorption solution in the concentration control storage chamber. Parts in FIGURE 2 corresponding to similar parts in FIGURE 1 have been identified by similar reference numerals. Referring to the structure shown in FIGURE 2, the means for preventing the accumulation of absorption solution in the storage chamber 80' includes a conduit 86 extending from the condenser outlet 63' directly into the chamber 80'. Conduit 64' is shown as opening into and extending from the upper part of the discharge end of the condenser to the conduit 82' at the bottom of the chamber 80', with the conduit 66' branching off from this latter conduit.

It has been found that liquid refrigerant passing from the condenser 22' directly to the storage chamber 80' through the conduit 86 will displace any absorption solution that may be in the chamber 80 provided that the dimension $d$ is at least about $0.5d'$; $d$ representing the approximate distance between the outlet 63' of the condenser or upper end of the conduit 86, and the center line of the conduit 66', while $d'$ represents the approximate distance between the center line of the conduit 66' and the bottom of conduit 86.

The modification of FIGURE 2 will function according to the same general principles as the concentration control arrangement of FIGURE 1, as should be evident.

As indicated heretofore, it is contemplated that either of the concentration control arrangements described above and shown in FIGURES 1 and 2 may be incorporated in an absorption refrigeration unit of the type designed to selectively perform either a heating or cooling function, such as the systems disclosed in the Sherwood patent, or the patent to Anderson 2,851,255, the disclosures of which are incorporated herein by reference, insofar as they contribute to the description and understanding of the types of systems to which the invention will now be set forth as being applicable.

FIGURE 3 illustrates schematically an absorption refrigeration system of this type and wherein parts similar to those previously described in connection with the embodiment of FIGURE 1 have been identified by similar reference numerals. Thus, this system includes the generator 20a, separator head 42a, condenser 22a, evaporator 24a, absorber 26a, heat exchanger 28a, and concentration control storage chamber 80a, all arranged and interconnected in a manner similar to that involved in the embodiment of FIGURE 1, as will be evident. In the embodiment of FIGURE 3, however, means are provided for directing hot refrigerant vapor from the separator head 42a directly to the evaporator 24a when it is desired to operate the unit for heating purposes. This means comprises a by-pass conduit arrangement including a down leg 88 connected at its upper end to the separator head 42a, and at its lower end to a vessel 90 which in turn connects to an up leg 92 opening into a vessel 94, which arrangement forms a liquid trap 91, as shown. A conduit 96 extends from this vessel 94 to the evaporator, another conduit 98 extends from this vessel to the absorber 26a, and still another conduit 99 extends from this vessel to conduit 74a, as indicated. A conduit 100 and including a U-shaped trap 102 is connected between the vessel 90 and the conduit 52a.

A valve 104 is shown as being provided in the inlet line 58a for regulating the flow of cooling water through the absorber and condenser whereby the flow of cooling medium may be discontinued whenever it is desired to initiate a heating cycle, as disclosed in the aforesaid Sherwood and Anderson patents.

When the system of FIGURE 3 is operating on a cooling cycle, absorption solution will enter the conduits 88, 92 and vessel 90 from the conduit 52a through the conduit 100 and U-shaped trap 102, as will be understood. The absorption solution will rise in conduit 88 to approximately the same level therein as the level of absorption solution in the conduit 48a and indicated by the letter X. In conduit 92, the solution rises to a level corresponding to the overflow level from the upper end of conduit 52a.

Thus, the absorption solution in these conduits 88, 92 will form a liquid barrier preventing the passage of hot refrigerant vapor from the separator head 42a to the evaporator.

To initiate a heating cycle, the valve 104 is closed whereby there will be an increase in pressure in the separator head, as described in the Sherwood patent. This increase in pressure will enable the hot refrigerant vapor to pass down through tube 88, through the trap 90 and then up through tube 92 into the vessel 94 which operates as a second separating chamber during heating cycles. The flow of water vapor up through this tube 92 carries with it the absorption solution which has drained from the separator head 42a through the tubes 48a, 52a, 100, 102 and into the vessel 90. From this second separating chamber 94, the hot refrigerant vapor will flow through the tube 96 to the evaporator 24a which now operates as a heating coil wherein the hot refrigerant vapor will be condensed to transfer heat to the air passing over the coils. The condensed refrigerant will then flow through the tube 72a to the absorber 26a where it will go into solution with the absorbent entering the absorber from the secondary separating chamber 94 through conduit 98. Part of the absorption solution will pass from vessel 94 through conduit 99 to conduit 74a, but, as described in the Anderson patent, this will not prevent solution from accumulating in vessel 94 and flowing through conduit 98 to the absorber.

As will be apparent from the foregoing description of the FIGURE 1 embodiment, the similar concentration control arrangement of FIGURE 3, including the storage chamber 80a, and the conduits 64a, 82a and 84a will operate to cause some liquid refrigerant to be withdrawn from the active circuit and collected in the storage chamber 80a in accordance with the condenser temperature, when the unit is operating on a cooling cycle. However, when the unit is operating on a heating cycle, as described, it is desirable that any liquid refrigerant that might previously have been stored in chamber 80a or that might tend to collect in this chamber during the heating cycle be returned to the active circuit, in order for the system to operate most efficiently, as will be understood. Accordingly, the invention contemplates means for assuring that no liquid refrigerant will remain in the chamber 80a during operation of the unit for heating purposes. In the illustrative embodiment of this means, there is provided a Venturi section 106 in the down leg 88 of the vapor by-pass arrangement, with a conduit 108 opening into and extending from the throat of this Venturi section into the storage chamber 80a, terminating adjacent the bottom thereof, as shown. Thus, during heating cycles, there will be a flow of hot refrigerant vapor through the Venturi section 106, to create a suction in line 108 and draw any liquid refrigerant in storage chamber 80a into the down leg 88 for circulation in the active part of the system. The storage chamber 80a will therefore be kept empty during heating cycles, as should be evident. During cooling cycle operation, there will be no flow of vapor through the down leg 88, and the pressure in tube 108 will be the same as that in line 84a.

It will be noted that the arrangement of the Venturi section 106 and tube 108 will also provide a means for quickly and conveniently withdrawing any absorption solution which may have entered the storage chamber 80a. This can be done by operating the system for a sufficient period of time with the valve 104 closed.

It will be appreciated that the vapor by-pass arrangement has been shown schematically in FIGURE 3 for illustrative purposes only. The construction of this by-pass arrangement may be varied, as desired, as will be understood, it being contemplated that regardless of the construction of the by-pass arrangement, a Venturi section or equivalent means be provided in the down leg of the vapor conduit leading from the separator head, as shown, and communicating with the storage chamber, as through the tube 108, in order to assure that no liquid will accumulate or remain in the storage chamber 80a during heating cycle operation.

The present invention will thus be seen to completely and effectively accomplish the objects enumerated hereinabove. It will be realized, however, that various changes and substitutions may be made to the specific embodiments disclosed herein for the purpose of illustrating the principles of this invention, without departing from these principles. Therefore, this invention includes all modifications encompassed within the spirit and scope of the following claims.

What is claimed is:

1. In an absorption refrigeration apparatus of the two-pressure type having a plurality of parts including a generator, a condenser, an evaporator and an absorber interconnected to form a system for circulation of a refrigerant and an absorption solution, the improvement which comprises: an absorption solution concentration control arrangement connected to said apparatus and arranged to withdraw some liquid refrigerant from the normal refrigerant flow circuit during periods of operation of the apparatus and to retain such withdrawn liquid out of the normal refrigerant flow circuit during periods when the apparatus is not operating, said concentration control arrangement including means for varying the amount of liquid refrigerant withdrawn directly in accordance with the condenser pressure.

2. In an absorption refrigeration system having a high pressure side including a generator and a condenser and a low pressure side including an evaporator and absorber, said generator, condenser, evaporator and absorber being interconnected to provide for circulation of a refrigerant and an absorption solution, means for maintaining the pressure differential between the high and low pressure sides of the system, means for controlling the concentration of the circulating absorption solution and including a vessel connected at one point to receive liquid refrigerant directly from said condenser and upstream of the means establishing the pressure drop into said evaporator, and said vessel at another point being in open fluid communication with the high pressure side of said system upstream of said condenser.

3. The structure defined in claim 2 wherein said means for maintaining the pressure differential between the high and low pressure sides of the system includes a conduit extending between the condenser and evaporator and having a high and a low pressure side therein, said vessel being connected at said one point to the high pressure side of said conduit.

4. The structure defined in claim 3 wherein a conduit connects said vessel at said other point directly to the main flow path between said generator and said condenser.

5. In an absorption refrigeration apparatus having a generator, a condenser, an evaporator and an absorber all being provided with inlet and outlet means and interconnected to form a system for circulation of a refrigerant and an absorption solution, means for controlling the concentration of the circulating absorption solution and including a vessel connected at one end directly to the outlet means of said condenser for collecting liquid refrigerant leaving said condenser, said vessel also being in direct communication at the other end thereof with the pressure existing in the main flow path between the generator and the condenser.

6. A vacuum-type absorption refrigeration apparatus having a plurality of parts including a generator, a condenser, an evaporator and an absorber interconnected to form a system for circulation of a refrigerant and an absorption solution, the generator and condenser normally operating at approximately the same pressure, and the evaporator and absorber also normally operating at approximately the same pressure but the latter pressure being lower than the first-named pressure, means for maintaining the pressure difference between the high and low pressure sides of the apparatus including a conduit for liquid refrigerant extending between said condenser and said evaporator, means for controlling the concentration of the circulating absorption solution and including a storage vessel connected to receive liquid refrigerant from the high pressure side of said conduit between said condenser and said evaporator, and means establishing communication betwene said vessel and the pressure existing in that part of the apparatus between said generator and said condenser.

7. The apparatus defined in claim 6 wherein a separator head is interposed between said generator and said condenser, conduit means connecting said generator to said separator head and said separator head to said condenser, and further wherein said communication establishing means includes a conduit connecting said separator head to said vessel.

8. The structure defined in claim 7 wherein said storage vessel is below said condenser and further wherein said conduit connecting said separator head to said vessel opens into the upper part of said vessel while another conduit extends from the bottom of said storage vessel to the high-pressure side of said liquid refrigerant conduit between said condenser and said evaporator.

9. The apparatus defined in claim 6 and further including means for preventing the accumulation and storage of absorption solution in said storage vessel.

10. In an absorption refrigeration apparatus having a plurality of parts including a generator, a separator head, a condenser, an evaporator and an absorber, a conduit arrangement interconnecting said parts to form a system for the circulation (1) of a refrigerant from the separator head through the condenser and evaporator and into the absorber and (2) of an absorption solution from the absorber to the generator and separator head and back to the absorber, the improvement which comprises: a vessel disposed below said condenser for storing liquid refrigerant out of its normal flow circuit in said apparatus; a first line connecting the bottom of said vessel to the liquid refrigerant conduit between said condenser and said evaporator; and a second line connecting the upper region of said vessel to the pressure existing in the region of said separator head.

11. The apparatus defined in claim 10 and further including means for preventing the accumulation and storage of absorption solution in said storage vessel, said means including a third conduit extending from the condenser into said vessel for delivering liquid refrigerant to said vessel.

12. In an absorption refrigeration apparatus of the two-pressure type having a plurality of parts including a generator, a condenser, a heat exchanger and an absorber interconnected to form a system for circulation of a refrigerant and an absorption solution, means for cooling said condenser, a by-pass conduit means between the generator and the heat exchanger for flow of hot refrigerant vapor to the heat exchanger, liquid column forming means in said by-pass conduit means for establishing a barrier between the generator and heat exchanger, means for controlling the concentration of the circulating absorption solution, said latter means including a vessel defining a storage chamber for refrigerant, a first conduit connecting the bottom of said vessel to receive liquid refrigerant leaving said condenser, a second conduit connecting the upper regions of said vessel to the pressure existing in the main flow path between said generator and said condenser, means for discontinuing cooling of the condenser, and means operatively connected to said by-pass conduit means and to said vessel for returning withdrawn liquid refrigerant in said vessel to said system when the operation of the condenser cooling means is discontinued to remove the barrier in said by-pass conduit means.

13. The apparatus defined in claim 12 wherein said means operatively connected to said by-pass conduit means and to said vessel includes a Venturi section in said by-pass conduit means and a conduit extending from said Venturi section into said vessel.

14. In a heating and cooling system, an absorption refrigeration apparatus of the two-pressure type having a plurality of parts including a generator, a condenser, an evaporator which functions as a heater on heating cycles and as a cooler on cooling cycles, and an absorber interconnected to form a system for circulation of a refrigerant and an absorption solution, means including a conduit for liquid refrigerant extending between the condenser and evaporator and operating to maintain a pressure difference therebetween, means for controlling the concentration of the circulating absorption solution, said latter means including a vessel defining a storage chamber for refrigerant, means connecting said vessel to receive liquid refrigerant from the high pressure side of said conduit between said condenser and evaporator, means establishing continuous communication between said vessel and that part of the apparatus between said generator and said condenser, and means operative during heating cycles for returning liquid refrigerant from said storage vessel back to said system.

15. The apparatus defined in claim 14 wherein said means including a conduit extending between the condenser and evaporator comprises an orifice in said conduit, and further wherein said means connecting said vessel to receive liquid refrigerant from said last-named conduit includes a conduit opening at one end into said last-named conduit upstream of said orifice and opening at the other end into the bottom of said vessel.

16. The apparatus defined in claim 14 wherein said means operative during heating cycles includes: a Venturi device connected for the flow therethrough of hot refrigerant vapor only on heating cycles, and a conduit opening at one end into said storage vessel and being in communication, at the other end thereof, with said Venturi device.

17. In absorption refrigeration apparatus of the two-pressure type having a generator, a condenser, an evaporator, and an absorber interconnected to form a system for circulation of refrigerant and an absorption liquid, the improvement which comprises a vessel connected and arranged to receive liquid refrigerant from said system and hold such liquid out of circulation at all times when operation of said system includes cooling of said condenser, and pressure differential responsive means operative to withdraw liquid from said vessel and return the withdrawn liquids for circulation in said system only when the operation does not involve cooling of said condenser.

References Cited by the Examiner
UNITED STATES PATENTS

| | | | |
|---|---|---|---|
| 2,155,510 | 4/39 | Shepperd | 165—62 X |
| 2,557,573 | 6/51 | Sherwood | 165—62 |
| 2,738,653 | 3/56 | Berry | 62—149 |
| 2,749,095 | 6/56 | Anderson et al. | 165—62 |

CHARLES SUKALO, *Primary Examiner.*

HERBERT L. MARTIN, *Examiner.*